(12) United States Patent     (10) Patent No.: US 7,720,608 B2
Lundgren     (45) Date of Patent: May 18, 2010

(54) METHOD AND SIGNAL PROCESSING MEANS FOR DETECTING AND DISCRIMINATING BETWEEN STRUCTURAL CONFIGURATIONS AND GEOLOGICAL GRADIENTS ENCOUNTERED BY KINETIC ENERGY SUBTERRANEAN TERRA-DYNAMIC CRAFTS

(75) Inventor: Ronald G. Lundgren, Cedar Crest, NM (US)

(73) Assignee: Applied Research Associates, Inc., Albuquerque, NM (US)

( * ) Notice: Subject to any disclaimer, the term of this patent is extended or adjusted under 35 U.S.C. 154(b) by 88 days.

(21) Appl. No.: 11/953,562

(22) Filed: Dec. 10, 2007

(65) Prior Publication Data

US 2009/0150078 A1    Jun. 11, 2009

(51) Int. Cl.
    *G01V 9/00*     (2006.01)
(52) U.S. Cl. ........................................................ 702/11
(58) Field of Classification Search .................... 702/11
    See application file for complete search history.

(56) References Cited

U.S. PATENT DOCUMENTS

| | | | |
|---|---|---|---|
| 2,465,395 | A | 3/1949 | O'Rear |
| 3,738,275 | A | 6/1973 | Schwartz |
| 3,851,522 | A | 12/1974 | Peterson |
| 4,375,192 | A | 3/1983 | Yates |
| 4,541,341 | A | 9/1985 | Fowler |
| 4,586,436 | A | 5/1986 | Denney |
| 4,799,427 | A | 1/1989 | Held |
| 5,180,882 | A | 1/1993 | Bansard |
| 5,255,608 | A | 10/1993 | Min |
| 5,872,324 | A | 2/1999 | Watson, Jr. |
| 6,053,109 | A | 4/2000 | Rudenauer |
| 6,105,505 | A | 8/2000 | Jones |
| 6,129,022 | A | 10/2000 | Hickey |
| 6,276,277 | B1 | 8/2001 | Schmacker |
| 6,378,435 | B1 | 4/2002 | Bai |
| 6,469,639 | B2 | 10/2002 | Tanenhaus |
| 6,483,323 | B1 | 11/2002 | Bai |
| 6,873,265 | B2 * | 3/2005 | Bleier ........................ 340/690 |
| 7,124,689 | B2 | 10/2006 | Davis |
| 2003/0140811 | A1 | 7/2003 | Bone |
| 2006/0090662 | A1 | 5/2006 | Biggs |
| 2006/0090663 | A1 * | 5/2006 | Biggs et al. ................. 102/215 |
| 2006/0145760 | A1 | 7/2006 | Yum |

* cited by examiner

*Primary Examiner*—Tung S Lau
(74) *Attorney, Agent, or Firm*—Dinsmore & Shohl, LLP; Monika J. Hussell (57) ABSTRACT

The present invention is directed to signal processing means for detecting and discriminating between geological layers encountered by kinetic energy subterranean vehicles in flight (terra-craft), using a raw signal representing deceleration of the terra-craft. The signal processing means uses autocorrelation and filtering to amplify the rate of deceleration, allowing the same to be compared to extensive data compiled for the US government regarding rates of deceleration in known materials, using various craft geometry. In this way, the unknown material encountered by the terra-craft can be identified by comparing the deceleration of the craft through a layer of material to the known data for the craft geometry. The signal processing means may further include a plurality of circuits to detect and annunciate varying layers in a media, and to track in real time the location of the projectile.

14 Claims, 9 Drawing Sheets

Smart Fuze Algorithm

Overall Diagram

Figure 1
Smart Fuze Algorithm
Overall Diagram

Figure 2

Auto Correlation & Hard Filtering

Figure 3

Auto Correlation & Void Filtering

**Figure 4
Depth Subsystem**

Figure 5
Hard Layer Detection

**Figure 6
Void Detection**

Figure 7
Double Void Elimination System

Figure 8
In Void Logic System

Figure 9
Soft Layer Detection Subsytem

Figure 10

Simulation Display of Figure 1 Overall Diagram
Figure 11

METHOD AND SIGNAL PROCESSING MEANS FOR DETECTING AND DISCRIMINATING BETWEEN STRUCTURAL CONFIGURATIONS AND GEOLOGICAL GRADIENTS ENCOUNTERED BY KINETIC ENERGY SUBTERRANEAN TERRA-DYNAMIC CRAFTS

BACKGROUND OF THE INVENTION

The present invention relates to a method and signal processing means for detecting and discriminating between natural and structural layers encountered during the terra-flight of kinetic energy vehicles. Kinetic energy vehicles in terra-flight (terra-craft) utilize their kinetic energy to traverse the layers of a structure or geologic media. The present invention is based on the very creative but non-intuitive postulate that peak g-s (that is the peak rate of velocity removal from a terra-dynamic system) is totally dependent on the material encountered during flight and the geometry of the terra-craft. Therefore, each material for a given craft geometry has a unique deceleration value, independent of the velocity of the craft. In practice, this unique value for each material is a very narrow band of values.

The present invention takes advantage of this postulate by generating the deceleration value for each layer of material through which a terra-craft travels, which value can then be compared to government acceleration data of various kinetic energy projectiles taken for geological penetration technology. This government data has been gathered for over five decades, and velocity-specific information therefrom is used for purposes of understanding what loading a penetrating projectile undergoes at very high deceleration, to ensure that the projectile design is appropriate for purposes of traversing known layers of geological media. The present invention allows a new usage of this data (free from velocity values) derived from this multi-million dollar governmental test effort, to the benefit of extraterrestrial exploration or remote monitoring of hazardous locations such as volcanoes and sea beds. Furthermore, it is a novel method of detecting and identifying unknown layers of a geological media or concealed structure.

The signal processing means of the present invention utilizes a pseudo auto-correlation of the deceleration signal to separate different types of layers encountered by the terra-craft, leading to excellent sensitivity to distinguish between a wide range of material densities (and, with greater sensitivity, more information regarding the material make-up of each layer can be identified).

Therefore, the signal processing means of the present invention is especially beneficial in the exploration of geological formations (such as mountains, volcanoes etc.) or extraterrestrial bodies, to determine the layer structure thereof (identity hardness and, in some embodiments, depth of each layer), thereby providing critical information to determine the makeup and origin of the formation or body, and if desirable enable the accurate placement of sensors in particular layers there-within.

A terra-craft system traverses manmade protective and/or geologic media via its kinetic energy, in similar fashion to an aircraft traversing the atmospheric medium of terrestrial or extra-terrestrial bodies. The phrase "terra-dynamics" has been coined to imply the system's direct association to the field of aerodynamics. The principle difference being that a terra-dynamic system encounters many and varied media during its flight. Aero-dynamic media is restricted to the atmospheric make up of a celestial body.

Current sensor placement and munitions systems in geological exploration and military applications typically function via an electronic timer circuit installed on a terra-craft. The setting of this timer is determined by a specialist's educated guess, which in turn is based on the system geometry and available intelligence gathered on the structural characteristics of the target. Where no good intelligence is available, the timer setting becomes imprecise. The imprecision produces on-board functions at undesirable spatial locations, severely or totally diminishing the system effectiveness, requiring target re-strike with associated additional human and material exposure. Some devices will actuate with a proximity or acceleration sensor, or a timer coupled with a sensor. These devices are similarly limited to an educated guess as to how hard a target layer is or when (at what time) the terra-craft will reach a certain station.

However, even when a layer structure is known or suspected, this educated guess as to when a fuze or sensor should be actuated is fraught with problems; for example, concrete increases in hardness over time. This increase is non-linear so that a terra-craft will reach a different station at different times depending on the date at which the structure is approached. When a structure's geometry or layer structure is unknown, "educated guesses" frequently result in the inaccurate placement of sensors (or detonation of munitions), requiring the use of additional resources to repeat the placement.

In U.S. Application Publication No. 2006/0090663 ("Biggs"), a layer detection system is generally disclosed for purposes of categorizing and counting layers, and detonating explosives upon reaching a pre-determined location. The method/system includes detecting a deceleration threshold, and enabling a delayed detonation program that may include hard layer counting, void counting, or both. Once the pre-programmed number and/or sequence of layers and voids is detected by the Biggs' system, the weapon is detonated. Biggs, however, fails to transmit to a remote location a signal representing the deceleration encountered by the weapon, and further fails to analyze information regarding the deceleration to identify the material make-up of the structural layers encountered by his weapon. The present invention, on the other hand, returns valuable information regarding layer structure to a remote location so that the material make-up of unknown layers can be identified and, as your inventor has discovered, does not need to measure velocity to make such identifications.

Other than the present invention, none of the foregoing technologies generate a signal or value useful in the identification of the specific materials that make up layers of a target or geological media. Furthermore, there is a need for this technology so that terra-craft can travel to remote locations to determine geological makeup. This would be particularly helpful in space exploration, where present sampling of geological layers near a landing site provides inaccurate data, as the landing contaminates the site and spoofs the investigation of planetary makeup. Thus, the present invention provides signal processing means that can generate and process a deceleration signal to identify specific geological materials, and reliably act on this information by, for example, placing a sensor or detonating explosives at a particular location. The present invention further provides for a more sensitive layer detection system than one designed based upon the minimal disclosure in Biggs.

SUMMARY OF THE INVENTION

The present invention, by articulating layers and deceleration values associated therewith, does not have the same problems or shortcomings as the prior art, and has the expanded capability of identifying layer substances in geological and extraterrestrial exploration. The present invention comprises an autonomous real time sensor interrogator that accompanies a terra-craft during its flight through the target media, and is capable of discriminating between and transmitting a signal representing the deceleration of the terra-craft, so that the various layers that make up a geological area can be identified. In some embodiments, the terra-craft can function based on some of this information, providing a significant force multiplier for terra-craft systems, and drastically reducing additional human and material expenditures. In some embodiments, the present invention can additionally gather information regarding the striking velocity of the craft by counting the frequency of reduction of RF signal strength (nulls) in the automatic gain control circuit of a receiver, and determine the location of the craft as it travels through the geological media, and the depth of each layer of material. The receiver can be collocated on the terra-craft or it can located remotely, such as on an orbiter a very far distance from the terra craft. This invention can be particularly useful when coupled with acceleration data gathered by and for the U.S. government over the past fifty years.

The signal processing means of the present invention detects, categorizes and annunciates in real time varying layers of the medium through which a terra-craft travels, by receiving and processing a signal representing deceleration of the craft from a transducer, such as an accelerometer, and by transmitting the signal to a remote location for additional processing. Coupled with the afore-described acceleration data, the makeup of various layers encountered by the craft can be identified. In some embodiments the signal processing means of the present invention can annunciate the number of layers, the hardness category of each layer (hard, soft, and void, as the same may be categorized by individual programming design) and even identify the spatial position of the craft. Therefore, while the signal processing means and general concepts in Biggs attempted to match deceleration values to layers it anticipated (therefore requiring little discrimination between layers, as the exact makeup of the layer was immaterial in his application), the present invention produces data with great sensitivity, which can be compared to acceleration data at a remote location to determine unknown layer composition.

This sensitive layer detection is accomplished by the signal processing means of the present invention, wherein autocorrelation or similar circuitry amplifies the differences in deceleration experienced by differences in layer materials, allowing the gradients to be detected. For example, a terra-craft having the signal processing means of the present invention produces a signal with sufficient sensitivity so that, when compared to known acceleration data, varying media gradients in geologic media rock (where the surface and subsurface have been exposed to weathering which may have softened the subsurface and/or caused cracks and fissures) can easily be discerned.

Figure 10:
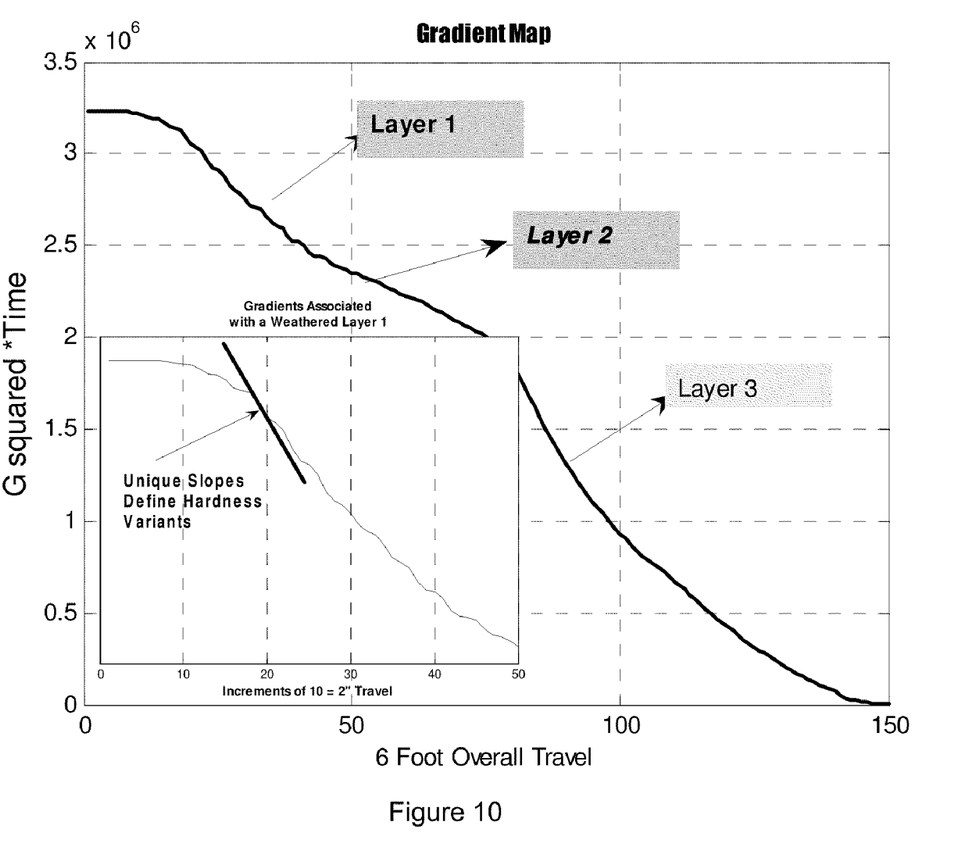
FIG. 10 is a sample gradient map of the signal generated by the filtering means of the present invention.
Figure 11:
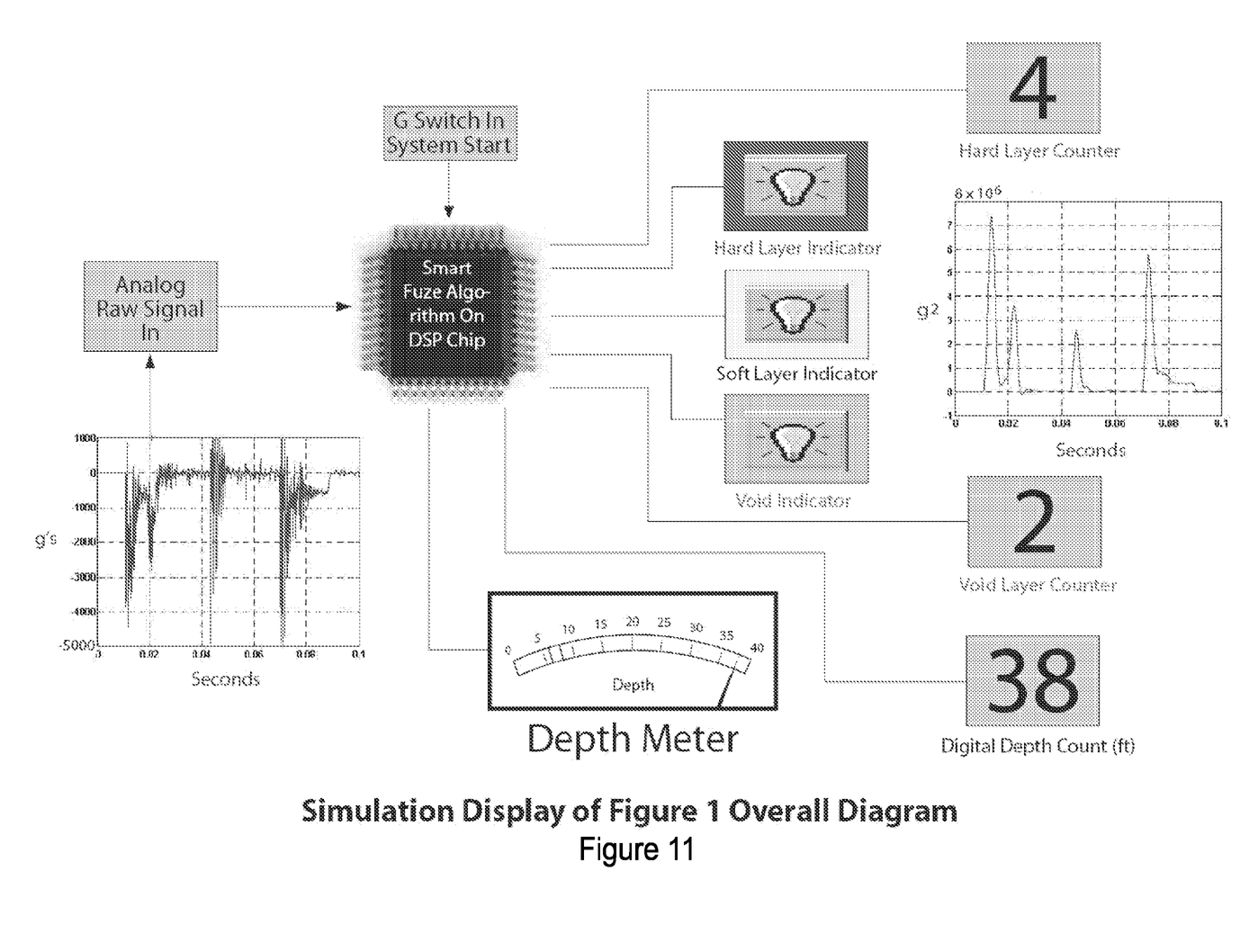
FIG. 11 shows some of the output values of the method and device of the present invention.

As an example, FIG. 10 shows a terra-craft travel of 6 feet within a granite rock geology. The graph is, by the methods of this invention, an autocorrelation of the acceleration time history signal, and clearly shows three distinct layers of different hardness that would, using the devices in the prior art, be perceived as uniform. In addition, within the top layer there are clearly sub-gradients that average two inches of travel. The slopes of these gradients are the unique hardness numbers associated with the media and the projectile geometry, as shown in the inset for time interval 1 thru 50.

The data gathered by the use of the present invention can be compared to known-source acceleration information, and layer make-up can thereby be identified, since the slopes are unique values ($g^2$) that define the media. Therefore, this invention facilitates the exploration and identification of terrestrial sources not amenable to manned exploration.

The signal processing means of the present invention has a large dynamic range, capable of detecting layers from terra-crafts that range in weight from 750 to 5,000 lbs., and have a maximum velocity of 3,500 ft/s, preferably in the range of 750 to 2,750 ft/s. It can detect density gradients in geological media layers as low as or lower than 10%. In theory the limit of this signal processing invention is much less than 10%; however, the present state of sampling and constraints to ancillary power usage limit the density gradient detection. In addition, the signal processing means of the present invention may also be used in smaller crafts, weighing less than 750 lbs, which are more suitable for some geologic and extra-terrestrial investigations; in these applications, the constants of discrimination ($g^2$) must be changed to accommodate the higher acceleration amplitudes. Therefore, for example, in the standard dynamic range (where the terra-craft is in the range of 750-5,000 lbs), the constants for discrimination of hard layers occupy the range of $>10^6 \, g^2$, and voids are $<10^5 \, g^2$ (void may be set arbitrarily high to harden the circuitry against transducer zero shrifts). Soft layers are in-between the set hard and void limits. When the craft weighs less than 750 lbs., the constant for discrimination must be increased to accommodate the higher acceleration amplitudes (thus for a one-tenth scale of the standard dynamic range, hard layers may occupy the domain of $>10^8 \, g^2$).

BRIEF DESCRIPTION OF THE DRAWINGS

The following drawings show some embodiments of the method and device of the present invention, but are not intended to limit the scope thereof, which is defined by the claims.

DETAILED DESCRIPTION OF EMBODIMENTS OF THE INVENTION

Generally, the present invention regards a method and signal processing means for identifying different layers of a geological media using the deceleration of a terra-craft as it traverses through multiple layers of the geological formation. As stated above, the initial impact velocity of the terra craft (or the determination of velocity of the craft at any time) is immaterial to the identification of a media layer using the method and signal processing means of the present invention; rather, each type of media will produce the same deceleration value on a terra-craft penetrating through such layer, regardless of the craft's velocity (provided that some adjustment to the constants of discrimination may be required to accommodate higher acceleration amplitudes encountered by smaller craft).

The present invention includes a method of identifying media layers of a geological formation or structure, using a terra-craft. Generally, the method includes the steps of: (a) projecting a terra-craft through the layers of the geological formation; (b) generating an analog signal representing deceleration of the craft as it travels through the layers; (c) transmitting the signal to a remote location; (d) receiving the signal at the remote location; (e) pseudo-autocorrelating and filtering the signal to intensify the differences in deceleration resulting from the craft projecting through different media layers; and (f) deriving a unique value (or narrow range of values) for at least one layer of the geological formation, and comparing that value to known material acceleration data so that the layer material can be specifically identified.

The signal processing means of the present invention receives the raw deceleration signal generated by a transducer on a terra-craft; transmits the signal to, and receives the signal at, a remote location; and pseudo-autocorrelates and filters the signal for purposes of intensifying the differences in deceleration resulting from the craft projecting through each media layer, from which material specific values can be derived, and can be compared to known material deceleration values to identify the material of at least one layer of a geological formation through which the terra-craft has passed.

An embodiment of the device of the present invention includes a transducer affixed to a terra-craft, which generates a signal representing deceleration of the craft; means to receive, auto correlate and filter the deceleration signal, thereby intensifying the differences in deceleration caused by each media layer; at least one filtering circuit to detect when the intensified signal is within a range of values; and at least one detection circuit to detect when the intensified signal is above a certain value, with this detection circuit having means to ignore echoes within said intensified signal.

Most transducers used to measure deceleration on a craft are Wheatstone Bridge sensors, with analog outputs in the microvolt range. Therefore, signal conditioning must be applied before further operations on the signal, typically by means of an amplifier and an anti-aliasing filter. Once the signal has been conditioned, it can be impressed digitally on a higher-frequency carrier wave and transmitted wirelessly to a remote location. In the event the information required to identify layers occupies a minimal frequency range (very near the DC frequency), and only a minimal bandwidth will be required. Upon receipt of the remote location, the signal is re-created by taking it off of its position on the carrier, and decoding the signal. Your inventor prefers to use 'g' hardened transmitters offered by L3 Communications. signal. It is common design practice to utilize sub-carriers in this region for signals with low frequency content. After the analog signal is anti-aliased and amplified it is impressed onto a sub-carrier. This sub-carrier is in the KHz regime, usually less that 100 KHz, while the transmitter frequencies lie in the GHz regime. This sub-carrier is generated by the raw signal utilizing voltage to frequency converters known as VCOs (voltage controlled oscillators), and is in turn impressed on the transmitter's GHz signal. It is then a simple matter for a receiver to "throw away the GHz signal" and retain the KHz signal. At this point in the present art a computer de-modulates the sub-carrier mathematically, in lieu of discrete components, to recover the raw signal. This method of transmission and receiving is called FM-FM telemetry.

Once the signal is taken off the carrier, and decoded, the anti-aliased raw signal 1 is input into the filtering system of the present invention, comprising pseudo-autocorrelation filtering circuitry. This circuitry will determine the unique deceleration value of each layer of the media through which the craft passed. This value can then be compared to the unique deceleration data for similar geometry craft to determine the makeup of the media.

Figure 1:
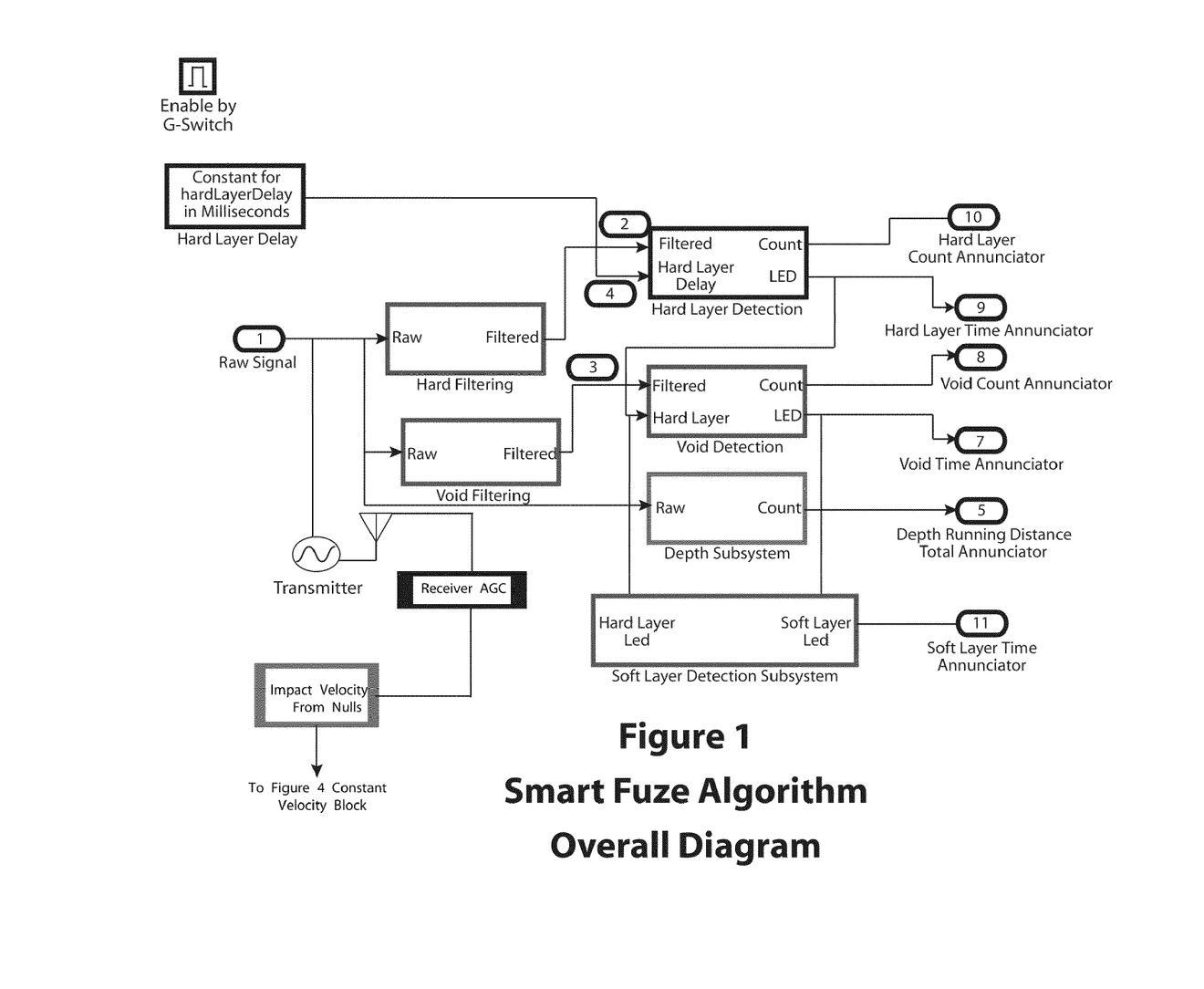
FIG. 1 is a block diagram of an embodiment of the signal processing means of the present invention.
Figure 2:
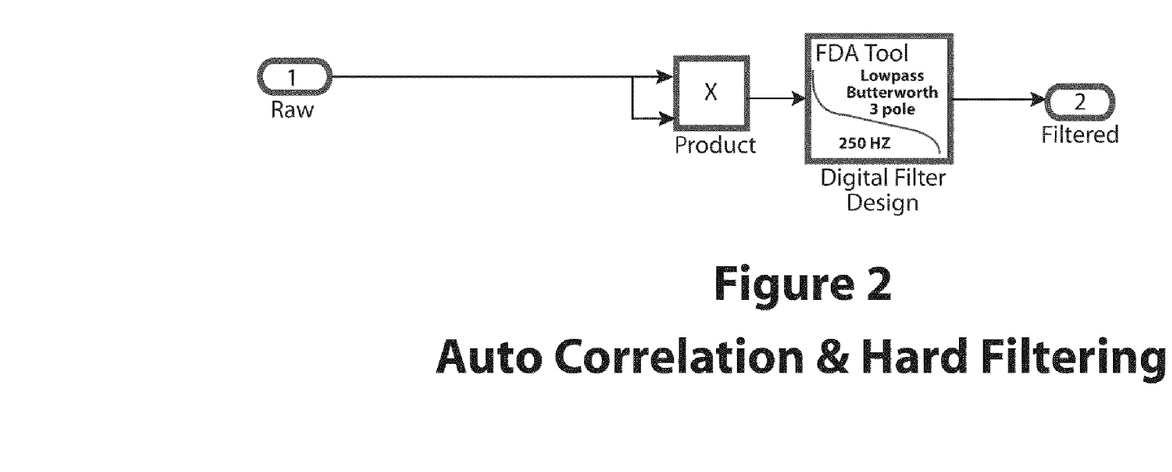
FIG. 2 is a circuit drawing of the autocorrelation and hard filtering system of an embodiment of the present invention.
Figure 3:
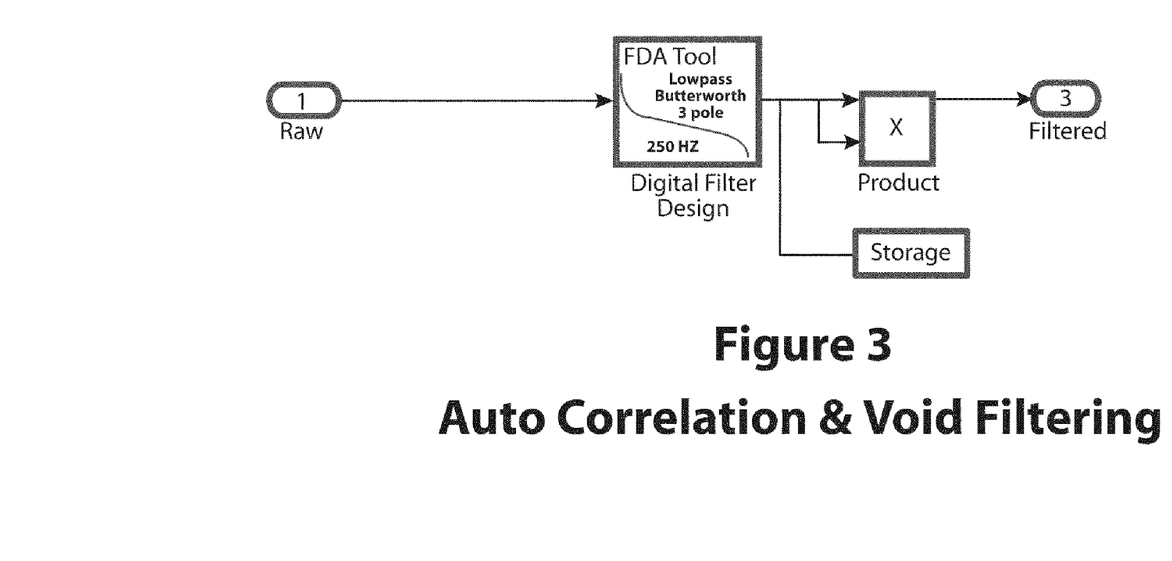
FIG. 3 is a circuit drawing of the autocorrelation and void filtering system of an embodiment of the present invention.

As shown in FIGS. 2 and 3, the filtering system preferably comprises a plurality of circuits to pseudo-autocorrelate the anti-aliased, raw deceleration signal 1, filtering the signal within corresponding pre-determined value ranges. While auto-correlation of a signal is the squaring and integrating of a signal on itself, preferably the filtering system (as shown in FIG. 2) of the present invention squares the anti-aliased deceleration signal's modulus and, in lieu of integrating the signal, filters the same with a 3 pole, 250 Hz, low-pass Butterworth filter (referred to herein as "pseudo-autocorrelation"). The use of a low-pass Butterworth filter replaces the fixed integration polynomial with digital filter polynomials of higher order to gain additional control of the form of output. This pseudo autocorrelation of the raw deceleration signal amplifies differences in deceleration and removes echoes that are prone to yield repeated nuisance annunciations of a layer. In some cases echoes are structural anomalies or thin layers, these echoes may be handled by logic instructions described below. This subsystem outputs a filtered signal 2, which carries the deceleration values of each layer encountered by the craft, and when compared to known deceleration data for similar geometry craft, identifies the media of each layer the craft encounters.

As shown in FIG. 3, if detection of voids is desired, the filtering circuitry may be reversed, so that the filtering precedes the squaring operation, which increases the resolution of the signal and provides a measure of hardening against any zero shifting of the transducer. This filtering subsystem outputs a void filtered signal 3.

In some embodiments of the present invention, the raw, anti-aliased signal may also be discriminated on the craft, which might allow other components on the craft to act based upon specific media layers detected. For example, the on-board discrimination circuitry described below may detect layers of water, and upon reaching such a layer, may activate a sensor placement device to eject a sensor from the craft within that layer; similarly, the on-board discrimination circuitry may count layers and voids encountered. In this or other embodiments, and where the craft may be retrievable, the filtered signals 2 and 3 may be recorded and stored on the craft, with or without being transmitted to a remote location, by means of a system similar to a "black box recorder" used on commercial aircraft.

In an embodiment of the system of the present invention, where on-board media discrimination is desirable, circuitry incorporated onto the terra-craft includes a filtering system and a layer detection system; in some embodiments, a depth system may also be incorporated. More specifically, the anti-aliased raw signal 1 is input into the filtering system comprising pseudo-autocorrelation hard and void filtering circuitry, embodiments of which are described above. After the signal has been run through the hard and void filtering circuitry, it can be passed to the logic circuitry of the layer detection system which tests the result against generic features of specific media. For example, if desirable to detect a layer of water on-board the craft, the deceleration value (narrow band of values) of water would be one of the generic features detected by the circuitry. In some embodiments the media layers are detected in three categories—hard, soft and void. The hard and void layer count is output at points 8 and 10 respectively. Points 7, 9 and 11 provide LED format annunciation of the passage of time through the hard, void and soft layers respectively.

For purposes of the present invention a layer is considered to be "hard" when it is formed of a material exhibiting a specified level of hardness or some other material characteristic which significantly impedes the flight of a terra-craft (causing measurable deceleration in the craft within a band of deceleration values associated with a specific media material or plurality of media materials). For standard geometry craft this is typically set at $10^6$ $g^2$. A layer is considered to be "void" when it hardly impedes the flight (your inventor prefers to set this at a maximum of $10^5$ $g^2$ to overcome a transducer zero shift or delayed ringing). Finally, a layer is considered to be "soft" when it falls between these categories.

Figure 5:
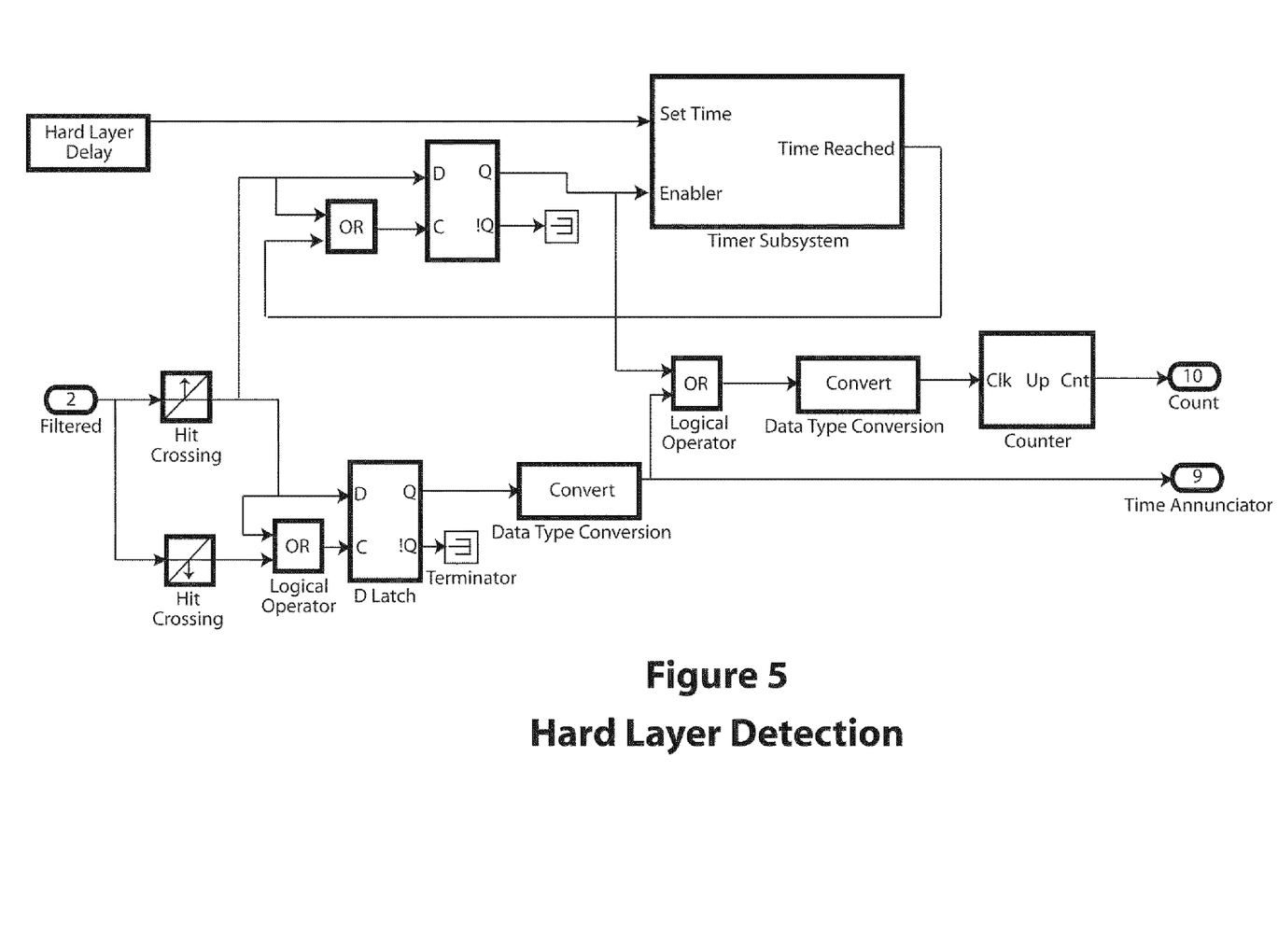
FIG. 5 is a circuit drawing of the hard layer detection system of an embodiment to the present invention.

As shown in FIG. 5, the hard layer detection subsystem of the present invention receives and processes the signal 2 from the auto-correlation and hard filtering circuitry to determine whether the craft is passing through a "hard" layer. Specifically, the subsystem announces a hard layer if the signal is above a certain $g^2$ amplitude, and monitors the time the terra-craft is in this layer (as long as the signal is above the declared amplitude). This amplitude test may be based upon the available data described hereinabove. Generally the subsystem comprises logic detection circuitry and additional filtering circuitry to avoid multiple counting of hard layers that are caused by disinteresting anomalies within a layer (causing the deceleration value to temporarily leave the value band).

As depicted in FIG. 5, the filtered signal 2 is amplitude detected to the lowest hard-layer amplitude set by the circuitry. At all times that the signal is above this set amplitude, a Boolean "true" signal is transmitted to the data input for a gated D Latch flip flop. The gate input for the gated D Latch is an OR gate receiving both this digital signal annunciating a rising threshold crossing, and a separate signal which annunciates a falling threshold crossing (when the filtered signal 2 falls below the lowest hard-layer amplitude set by the circuitry). This detection circuit of FIG. 5 determines if the signal is crossing this threshold rising (entering) or falling (exiting). Thus, the output of the OR tracks the input when the filtered signal 2 is above the amplitude threshold and sends a digital latch signal to an LED measuring and signaling time in the hard layer. The counter counts the hard layer encountered by the terra-craft, subject to the timer logic described below.

To ensure that a hard layer is not counted in multiples based upon an echo in the filtered signal 2, logic circuitry shown in the upper part of FIG. 5 is preferably included in the hard layer detection system, generally comprising a timer subsystem which has a fixed delay necessary or desirable for the echo to be ignored (generally one nose length for a projectile-type vehicle). A gated D latch flip flop receives the Boolean signal annunciating a rising threshold hit at its data input. Once the signal is passed through the D Latch flip flop, it enables the timing circuitry; once the fixed delay of time is reached, the timing circuitry transmits a signal to the OR gate controlling the gate input for the gated D Latch. The other signal delivered to this OR gate is the filtered signal 2, opening the gate when the amplitude threshold is met. The output of this flip flop thus tracks the signal when the signal is "true" and after the designated time has been met; if the signal becomes "false" before the designated time is met, the signal remains "true" because the gate is closed.

This D latch output signal is transmitted to an OR gate also receiving the signal from the first D latch, and transmits a digital signal to the counter whenever either signal is true (thus, while echoes may be reflected in the general counting circuitry, they are ignored by the fixed delay circuitry). The output signal 10 from the counter and this hard layer detection system is the hard layer count, and the annunciation of time in the hard layer is signal 9.

In accordance with the foregoing circuit design, the set amplitude detections of the hard layer detection circuits may be modified so that different materials or groups of materials may be detected real-time, on the craft.

Figure 6:
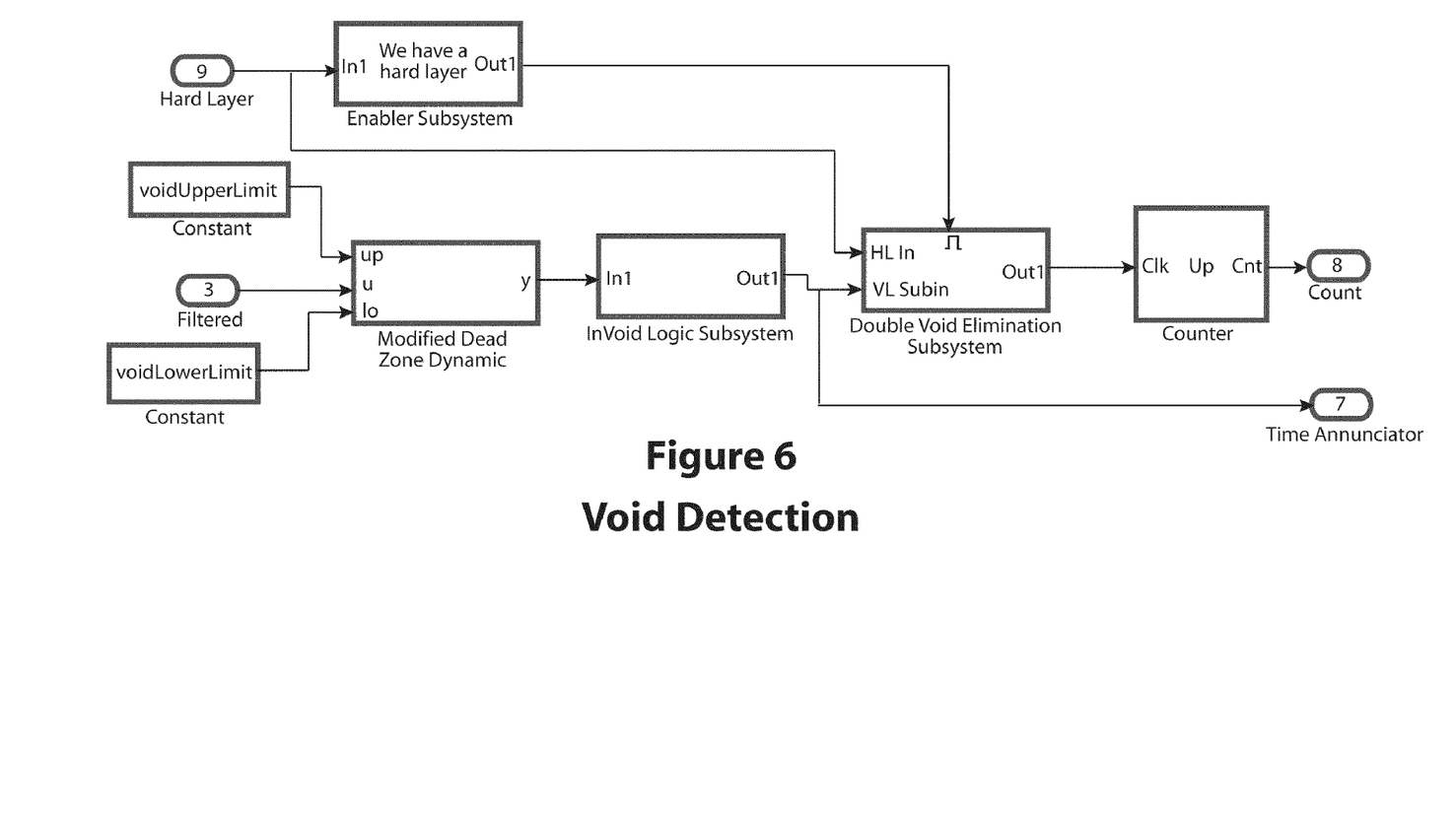
FIG. 6 is a circuit drawing of the void detection system of an embodiment of the present invention.

FIG. 6 illustrates an embodiment of the void layer detection circuit of the layer detection system. The auto-correlated, filtered signal 3 is amplitude detected via an interval test, where the interval is around zero. As in the case of the hard layer detection, logic is applied before the system will recognize a void. This logic assures that after a hard layer has occurred, the system waits one-half of a body length of travel before declaring a positive detection within the interval a void. As is the case for hard layers, echoes are eliminated so that multiple counting of void layers, while in a void, does not occur.

Figures 8, 9:
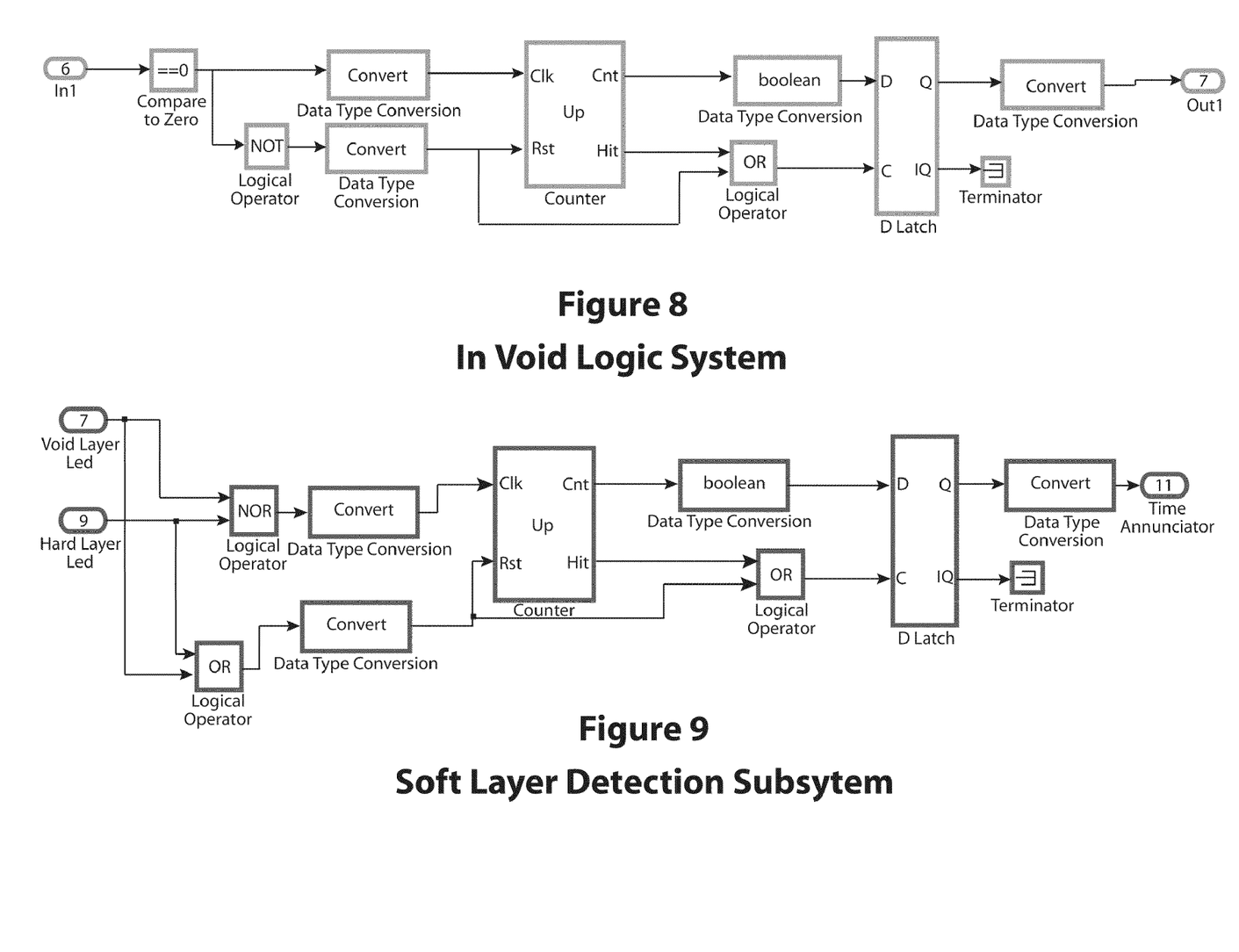
FIG. 8 is a circuit drawing of the in void logic system of the void detection system of the embodiment of the present invention shown in FIG. 6.
FIG. 9 is a circuit drawing of the soft layer detection system of an embodiment of the present invention.

Specifically, the auto-correlated, void filtered signal 3 uses a modified dead zone dynamic, having a void upper limit constant and a void lower limit constant, to output a digital signal y. This modified circuitry only outputs a digital zero when a signal is within the dead zone (between void upper limit and void lower limit, which can be predetermined and pre-programmed on the circuitry). As shown in FIG. 8, the signal y is then processed by an in-void delay logic circuit which compares the signal to zero. If the signal y is zero, a signal is sent to the clock CLK input of an up counter; if it is not zero a digital signal is sent to the reset RST input of the counter. The counter is set to count a single hit for each void layer, whereby the "hit" value is set so that echoes are ignored. Thus, the counter will count up so long as the signal y received from the modified dead zone dynamic is zero. In this manner the counter acts like a settable timer to assure a certain time in void has occurred. The count signal CNT generated by the counter is then converted to a Boolean "true" or "false" and input in the data input of a gated D latch flip flop; the clock/gate for said flip flop receives a signal from an OR gate receiving both the hit signal from the counter and the non zero (NOT) signal. The D latch flip flop tracks the converted CNT signal only after a hit has been detected or when a non zero signal is "true" (and the filtered signal 3 is outside of the dead zone). The output OUT1 from this subsystem is sent to the time annunciation LED 7 and to a double void elimination subsystem.

Figure 7:
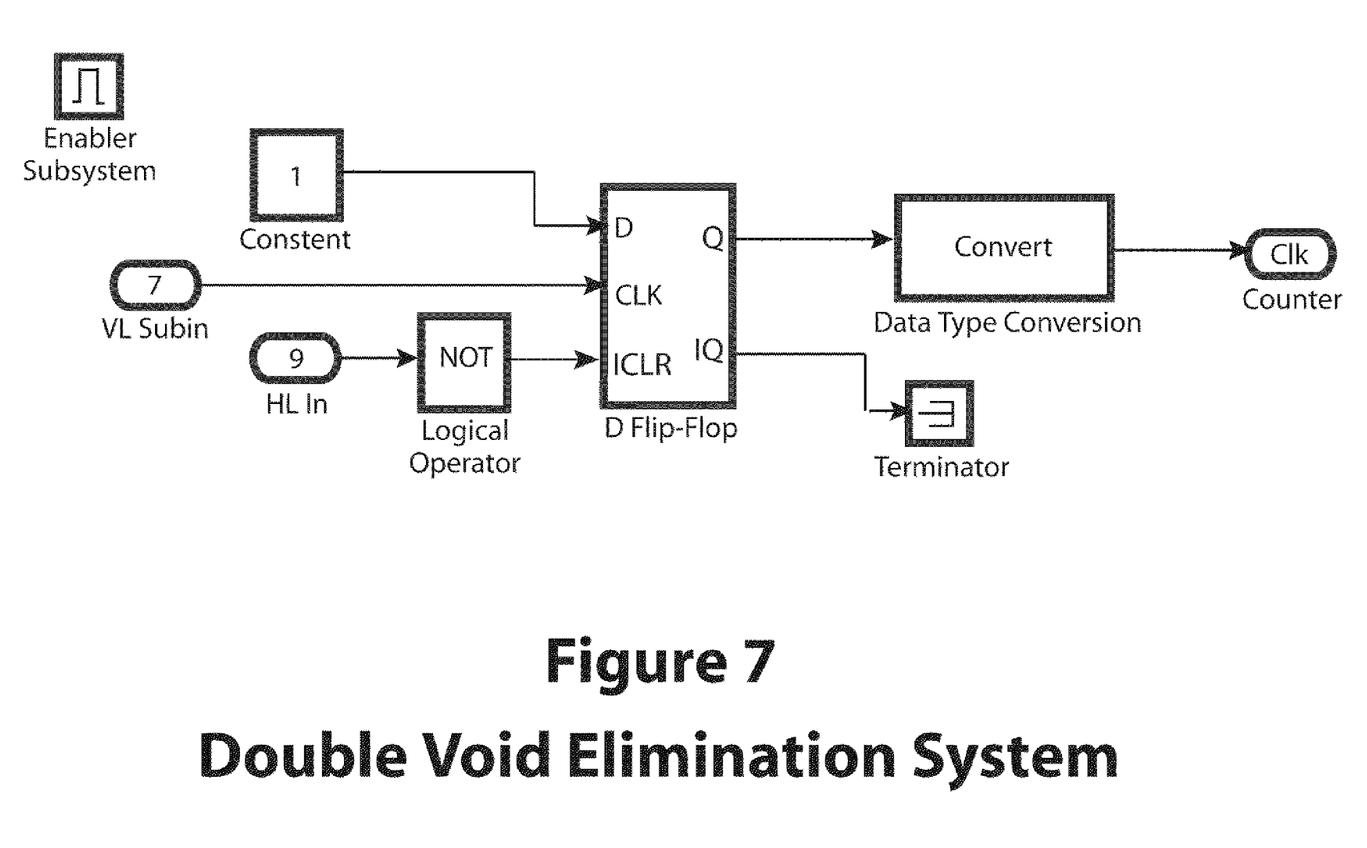
FIG. 7 is a circuit drawing of the double void elimination system of the void detection system of the embodiment of the present invention shown in FIG. 6.

Because this subsystem has only evaluated the raw filtered void signal, and not the raw filtered hard signal, a double void elimination subsystem is incorporated into the void detection system. The double void elimination circuitry, an embodiment of which is shown in FIG. 7, comprises a rising edge D flip flop having a constant digital signal input of 1 for the data input, the in-void logic signal 7 for the clock input, and the hard layer detection signal 9 (passed through a NOT gate) for the CLR input. If more than one hard layer is being detected by the present circuitry, then multiple inputs detecting hard layers would be required. When the void signal 7 becomes positive, the flip flop is enabled and its output Q is the constant 1; Q does not change until the gate is closed by the detection of a non-void layer (signal 9). The output from the double void elimination system is converted to a digital signal and sent to an up counter to record the number of void layers detected by the circuitry of the penetrating system of the present invention. In this manner only voids that follow a hard layer are declared voids; a hard-soft-void sandwich is nonexistent in structure construction, and highly unlikely in geological formations. The output signal 8 from this void detection circuitry is the void integer count, and the annunciation of time in void is output signal 7, which ceases to output when a non-void is detected.

As shown in FIG. 9, the soft layer detection subsystem receives both the void layer LED signal 7 and hard layer LED signal 9. In the event neither is "true", the signal is converted into a digital 1 and input into the CLK input of an up counter. In the event that either a void layer or hard layer is being detected, a digital signal 1 is sent to the RST of the up counter. Thus, whenever a hard or void layer is detected, the counter of the soft layer detection system is reset. By setting the hit value of the counter at a number greater than 1, the system creates an internal time delay that prevents the annunciation of a soft layer when a signal is traversing through soft layer values (but not soft layers) on its way up to or down from a void or hard layer. The counter output signal CNT is converted into a Boolean signal and input into the data input of a D Latch flip flop. The clock or gate input of the D Latch flip flop receives a signal from an OR gate, which receives a true signal when the hit value of the counter is reached or either a hard or void layer is detected. If either a hard or void layer is detected, or a hit is detected, the clock or gate of the flip flop is enabled and the output signal Q is generated. Thus, if neither a void layer nor hard layer is detected, the counter will count over the period of time that the craft is in this layer until either a hard or void layer is set, and send that signal CNT (converted) to the D Latch, which will output that signal Q when the hit value has been reached or either a hard or void layer has been detected. The output Q of this D Latch flip flop is converted back to a digital signal, and announces the time that the craft is in the soft layer at 11. All values between a void and hard layer will annunciate and count the entry of the craft in a soft layer (provided the values exist past the time delay). If multiple, varying hard layers are being detected by the system by additional hard layer detection systems, then additional inputs would be necessary in the soft layer detection subsystem in accordance with the teachings as set forth hereinabove.

Figure 4:
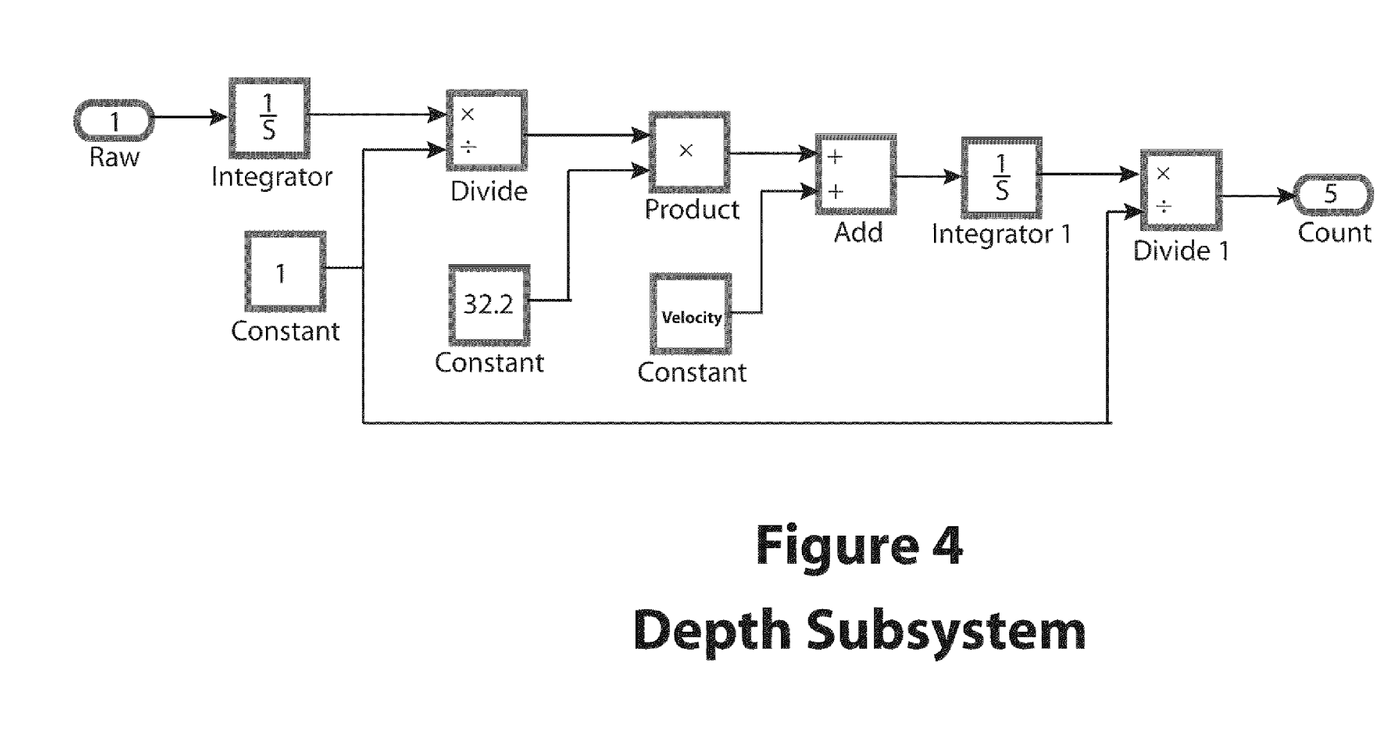
FIG. 4 is a circuit drawing of the depth system of an embodiment of the present invention.

In certain embodiments the signal processing means of the present invention further includes circuitry to monitor, in real time, the depth/location of the terra-craft. As shown in FIG. 4, this depth subsystem receives and integrates the raw (unfiltered) deceleration signal 1, divides it by a velocity constant (1, or the appropriate conversion value to convert the signal value into the type of units of velocity intended for use in this subsystem), multiplies it by the gravitational constant in units that match the velocity constant (e.g., 32.2 ft/s), adds the initial impact velocity (in the same units), integrates the signal again, and divides the same by the appropriate constant value to convert the output to the desired unit output, if necessary. From this circuitry, the signal 5 indicates the running depth of the terra-craft in feet. Critical to this calculation is the determination of initial striking velocity. This initial striking velocity may be estimated based upon the design of the intended use of the system, or by pulsing the transmitter prior to impact, allowing the nulls to be counted.

In some embodiments, the signal processing means of the present invention further detects when the craft encounters an initial impact with a media and, thereupon, measures the amount of time that has lapsed subsequent to such event and through each layer thereafter. With the initial impact velocity and deceleration information, the location of the craft can be determined in real time. Furthermore, the circuitry may be enabled only after a minimum media deceleration or thickness event has been observed; a switch or software means may be used to detect a first minimum deceleration threshold (in time of deceleration, depth traveled or in magnitude of deceleration, or any combination thereof) to enable the signal processing means of the present invention. These switches can be internal, self acting, consisting of balls and springs which close on a pre-determined acceleration, or software which interrogates transducers such as accelerometers or strain gages. This switch receives the raw deceleration signal from its interrogation of the transducer, or from a transducer, and determines whether the deceleration meets the threshold; in some embodiments this may be determined as a percentage of velocity (so that when velocity of the terra-craft decreases prior to reaching the threshold, the threshold deceleration also decreases). Once the deceleration threshold is met, the on-board signal processing means of the present invention is enabled and begins filtering and auto-correlating and processing the signal.

The signal processing means of the present invention is designed for purposes of identifying and counting layers encountered by the terra-craft, and may detonate explosives or release and activate a sensor, after the processor has determined that the projectile has arrived at a desired location within the geological formation, based upon a pre-determined combination of time of travel information, depth of penetration information, and/or media counting or discrimination information.

The signal processing means of the present invention may be embodied within a digital signal processor, a field programmable gate array, a microcontroller, a semi conductor, or other appropriately configured circuits or combinations thereof, which receives the alias free analog signal.

As an example of the benefits of the present invention, the existence of water in the subsurface of the planet Mars is in question. Over the years a wealth of data exists for frozen soils and almost all terrestrial ice configurations. This data exists for all projectile type terra-craft vehicle geometries configured over the 50+ years of terra-dynamic research. This data defines the threshold for detecting the existence of water on extraterrestrial bodies, and utilizing the methods of this invention can help us to identify whether subsurface water exists on the planet Mars.

While the invention may be susceptible to various modifications and alternative forms, specific embodiments have been shown by way of example in the drawings and have been described in detail herein. Thus, it should be understood that the invention is not intended to be limited to the particular forms disclosed and the invention includes all modifications, equivalents, and alternatives falling within the spirit and scope of the invention as defined by the following appended claims.

The invention claimed is:

1. A method of identifying media layers of a geological formation or structure, said method comprising the steps of:
   projecting a terra-craft through different media layers of a geological formation or structure;
   generating an analog signal representing deceleration of the craft as it travels through the media layers, said signal having a modulus;
   transmitting said analog signal to a remote location;
   receiving said transmitted signal at the remote location;
   squaring the signal's deceleration modulus, and filtering said signal with a low-pass Butterworth filter to intensify the differences in deceleration resulting from the craft projecting through the different media layers; and comparing said intensified signal to known deceleration data of various materials, to specifically identify the materials of at least one media layer.

2. The method of claim 1, further comprising the step of first filtering and then squaring the modulus of the deceleration signal to detect void layers in the geological formation or structure.

3. The method of claim 1, further comprising the step of detecting and categorizing layers of media through which the craft travels, by means of detection circuitry, said circuitry being designed to annunciate, in real-time, the category of media through which the craft travels.

4. The method of claim 2, wherein said void layer detection step comprises filtering the signal with a low-pass Butterworth filter.

5. The method of claim 3, wherein said detection circuitry comprises a time-delay circuit configured to ignore echoes in the deceleration signal.

6. Signal processing means for processing an analog deceleration signal generated by a transducer on a terra-craft, said deceleration signal representing deceleration of the craft as it travels through layers of media of a geological formation or structure, the signal processing means comprising:

means to digitally impress the deceleration signal onto a carrier wave and wirelessly transmit the analog deceleration signal from a craft to a remote location, said signal having a modulus;

means to receive said signal at the remote location; and circuitry to square the modulus of the signal in series with a low-pass Butterworth filter, configured to filter the analog deceleration signal, and to intensify the differences in deceleration resulting from the craft projecting through each media layer, said means generating a signal representing a unique value of deceleration for each media layer.

7. The signal processing means of claim 6, further comprising circuitry to first filter and then square the modulus of the deceleration signal and detect void layers encountered by the craft.

8. The signal processing means of claim 6, further comprising detection circuitry, said circuitry being designed to detect, categorize and annunciate, in real time, a category of media through which the craft travels.

9. The signal processing means of claim 7, wherein said void detection means comprises a low-pass Butterworth filter, and a time delay circuit to generate a signal representing presence within a void layer only after a pre-determined period of time within the void layer has passed.

10. A device for accurately detecting and identifying general characteristics of media layers encountered by a terra-craft, said device comprising:

a transducer which generates an analog signal, having a modulus, and representing deceleration of the craft;

circuitry to receive, filter and square the modulus of, the deceleration signal with a low-pass Butterworth filter in real-time, thereby intensifying the differences in deceleration caused by each media layer; and hard layer detection circuitry for detecting deceleration above a pre-determined hard layer deceleration value, said detection circuitry comprising time delay circuitry to ignore echoes within said deceleration signal.

11. The device of claim 10, further comprising void layer detection circuitry to first filter and then square the modulus of the deceleration signal to detect deceleration below a pre-determined void layer deceleration value.

12. The device of claim 10, further comprising means to detect the velocity of the craft; means to determine in real-time the depth of each layer; and means to determine in real-time the location of the craft.

13. The device of claim 11, wherein said void layer detection circuitry comprises a low-pass Butterworth filter, and a time delay circuit to transmit a signal representing presence within a layer only after a period of time has passed.

14. The device of claim 11, further comprising detection circuitry for detecting soft layers, when the deceleration signal is between the hard layer deceleration value and the void layer deceleration value.

* * * * *